(No Model.)
M. L. KISSELL.
SHOVEL STANDARD FOR CULTIVATORS.
No. 407,780. Patented July 30, 1889.
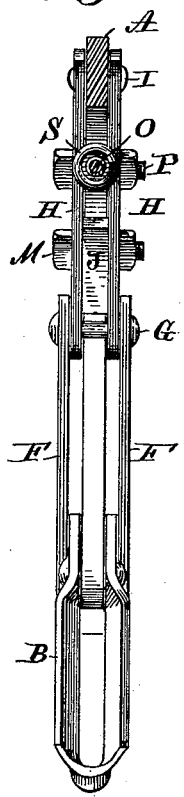
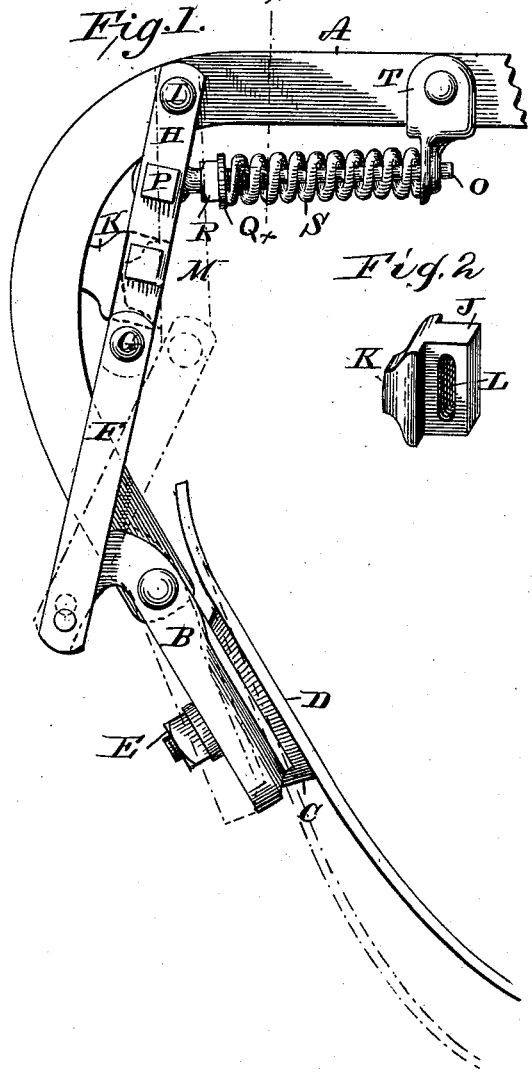
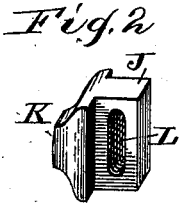
WITNESSES
G. M. Gridley
Warren Hull
INVENTOR
Martin L. Kissell,
By H. A. Toulmin
his Attorney.

UNITED STATES PATENT OFFICE.

MARTIN L. KISSELL, OF SPRINGFIELD, OHIO, ASSIGNOR TO P. P. MAST & COMPANY, OF SAME PLACE.

SHOVEL-STANDARD FOR CULTIVATORS.

SPECIFICATION forming part of Letters Patent No. 407,780, dated July 30, 1889.

Application filed February 1, 1889. Serial No. 298,398. (No model.)

*To all whom it may concern:*

Be it known that I, MARTIN L. KISSELL, a citizen of the United States, residing at Springfield, in the county of Clark and State of Ohio, have invented certain new and useful Improvements in Shovel-Standards for Cultivators, of which the following is a specification, reference being had therein to the accompanying drawings.

This invention relates to standards for cultivator and other shovels, and the design of the invention is to afford a yielding connection between the shovel and the standard, so that the shovel will deflect when resisted by unusual obstructions and by this deflection automatically free itself from the obstructions. I am aware that this object has been sought by others, and that patents have issued upon various forms of constructions with this end in view; but my improvements relate to special arrangements and special constructions, and consist, essentially, of an adjustable block carried by toggle-bars which enter into the general structure of the apparatus and are arranged to be placed in contact with the different portions of the curvature of the standard, so as to change the normal state of the toggle-bars and relatively the readiness with which the shovel will deflect, and also consist in arranging a resisting-spring beneath the standard and between a stop or clip and the toggle-bars, its position removing it entirely out of the way of the operator and avoiding any projection above the horizontal portion of the standard, both of which features will be hereinafter more fully explained.

In the accompanying drawings, forming a part of this specification, and on which like reference-letters indicate corresponding parts, Figure 1 represents a side elevation of a cultivator-standard, a shovel, &c., embodying my improvements; Fig. 2, a detail perspective view of the stop-block; and Fig. 3, a sectional view of Fig. 1 on the line $x\,x$, with the shovel removed.

Letter A designates the shovel-standard, the same being preferably substantially of the contour illustrated, and constructed of metal and fashioned to be connected with or to form a part of a cultivator-beam, or to be connected with the cross-head of that type of cultivators known in the market as "parallel-beam" cultivators, or with the cross-head of any other type of cultivator employing a cross-head. To the lower end of the standard is pivotally connected the shovel-lever B, the lower portion of which is fashioned to receive the shovel-back C, to which the shovel D is connected, a bolt and nut E being employed to effect the connection between the back C and said lever. The lever being of duplex form, as seen in Fig. 3, admits of the up-and-down adjustment of the shovel. The upper end of the lever extends to the rear of the standard a proper distance to give sufficient length to this shorter arm of the lever. To this shorter arm are pivotally connected two toggle-bars F—one at either side—and these bars pass upward and pivotally connect at G with two other toggle-bars H, which themselves pass upward, too, and at either side of the standard A, to which they are pivotally connected at I. The space between the bars H affords a slot in which I slidingly fit the heel J of a stop-block K. This heel is fashioned with a slot L, through which passes a bolt M, carried by the bars H, and by which the stop-block is secured to said bars, being clamped between them, while the slot admits of adjusting the block up and down.

It will be observed from Fig. 1 that the space between the curvature of the standard and the toggle-bars converges or grows narrow toward its extremities. By adjusting the block more or less toward these extremities the normal angle between the toggle-bars F and H is increased and the advantage the shovel has over the spring correspondingly increased, so that it will deflect under more or less resistance, according to such adjustment of the block.

The letter O designates a rod pivotally connected by a bolt P to the bars H and provided with a washer Q and a nut R, by which the tension of the spiral spring S, carried by said rod, may be adjusted. A clip T is bifurcated at its upper end to embrace the standard and secured by a bolt, while its lower end has an aperture through which the rod O plays, the said end also constituting a shoulder to resist the spring. It will be observed that the location of the spring and rod and clip is below the standard, leaving the upper side of the standard entirely free from projecting parts. This is desirable in machines of the character with which these improvements are used.

It will now be understood that if the lower portion of the shovel engages an unusual obstruction the shorter arm of the lever B will force the toggle-bars forward, compressing the spring and allowing the shovel to deflect back and clear itself of such obstruction, and that the spring will then return the shovel to normal position.

Having thus fully described my invention, what I claim as new, and desire to secure by Letters Patent, is—

1. The combination, with a shovel-standard, a lever pivoted thereto, and a shovel carried by said lever, of two sets of toggle-bars pivoted to each other and respectively to the said lever and standard, and a stop-block adjustable up and down and toward the intersection of either set of toggle-bars with the standard.

2. The combination, with a shovel-standard, of the toggle-bars and the stop-block carried by said bars and adjustable toward and from the intersection of the standard and said bars.

3. The combination, with a set of toggle-bars arranged with a space between them, of a stop-block having a slotted heel fitted upon said bars and a bolt passing through the bars and said slot and arranged to clamp the bars against the said heel while the slot admits of adjustment.

In testimony whereof I affix my signature in presence of two witnesses.

MARTIN L. KISSELL.

Witnesses:
C. C. KIRKPATRICK,
H. S. FOLGER.